(12) United States Patent
Kim et al.

(10) Patent No.: US 8,144,247 B2
(45) Date of Patent: Mar. 27, 2012

(54) DETECTION AND INTERPOLATION OF STILL OBJECTS IN A VIDEO SEQUENCE

(75) Inventors: Yeong-Taeg Kim, Irvine, CA (US); Zhi Zhou, Corona, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1314 days.

(21) Appl. No.: 11/766,722

(22) Filed: Jun. 21, 2007

(65) Prior Publication Data

US 2008/0316359 A1 Dec. 25, 2008

(51) Int. Cl.
*H04N 7/01* (2006.01)
*H04N 11/20* (2006.01)
(52) U.S. Cl. .......................... 348/452; 348/458
(58) Field of Classification Search ........... 348/441–459
See application file for complete search history.

(56) References Cited

U.S. PATENT DOCUMENTS

| | | | |
|---|---|---|---|
| 5,502,492 A | 3/1996 | Jung | |
| 5,777,682 A | 7/1998 | De Haan et al. | |
| 5,812,787 A | 9/1998 | Astle | |
| 6,219,436 B1 | 4/2001 | De Haan et al. | |
| 6,278,736 B1 | 8/2001 | De Haan et al. | |
| 6,459,455 B1 * | 10/2002 | Jiang et al. | 348/452 |
| 7,034,888 B2 * | 4/2006 | Lin et al. | 348/452 |
| 7,184,100 B1 | 2/2007 | Wilf et al. | |
| 2002/0172286 A1 | 11/2002 | Ohki | |
| 2003/0053543 A1 | 3/2003 | Bhaumik et al. | |
| 2004/0131267 A1 | 7/2004 | Adiletta et al. | |
| 2005/0031041 A1 | 2/2005 | Chujoh et al. | |
| 2005/0078222 A1 | 4/2005 | Liu et al. | |
| 2005/0100095 A1 | 5/2005 | Itoh et al. | |
| 2006/0280249 A1 | 12/2006 | Poon | |
| 2008/0002776 A1 | 1/2008 | Borer et al. | |

OTHER PUBLICATIONS

Cafforio et al., "Motion Compensated Image Interpolation", "IEEE Transactions on Communications", Feb. 1990, pp. 215-222, vol. 38, No. 2, Published in: US.

De Haan, "Video Scanning Format Conversion and Motion Estimation", "CRC Press LLC", 1999, p. 19 pgs, Publisher: Philips Research Laboratories, Published in: US.

De Haan, "Video Processing for multimedia systems", 2000, p. 245 pgs, Publisher: University Press Eindhoven 2nd Edition, Published in: Netherlands.

Santos et al., "Real-Time Opaque and Semi-Transparent TV Logos Detection", "CEP", 2006, p. 7 pgs, Publisher: Escola Politecnica, Universidade de Sao Paulo, Published in: Sao Paulo, Brazil.

(Continued)

*Primary Examiner* — Michael Lee

(57) ABSTRACT

The present disclosure provides systems and methods for detecting and interpolating still pixels. In certain embodiments, the systems and methods establish a still pixel level for each still pixel, and using that still pixel level, provide an interpolation procedure for determining the pixel value of a selected pixel at a frame a distance α from frame F(t−1). Disclosed embodiments are capable of providing motion compensated interpolation results for a wide variety of circumstances, including cases where the endpoints of the motion vector of a selected pixel to be interpolated vary between substantially still and not still, as well as cases where mixtures of temporal and motion compensation interpolations are necessary.

Still pixel candidates may be refined in a process where pixels that may be properly handled by standard motion compensation interpolation techniques are eliminated. Further, still pixel candidates may be flagged as high or low likelihood to further enhance confidence in the detected still pixels.

34 Claims, 11 Drawing Sheets

OTHER PUBLICATIONS

Love et al., "An Empirical Study of Block Matching Techniques for the Detection of Moving Objects", 1999, pp. 1-37, Publisher: Center for Applied Scientific Computing, Lawrence Livermore National Laboratory, Published in: Livermore, US.

Meisinger et al., "Automatic TV Logo Removal Using Statistical Based Logo Detection and Frequency Selective InPainting", 2005, p. 4 pages, Publisher: University of Erlangen-Nuremberg, Published in: Erlangen, Germany.

Puri et al., "An Efficient Block-Matching Algorithm for Motion-Compensated Coding", "IEEE", 1987, pp. 1063-1066, Publisher: AT&T Bell Laboratories, Published in: Holmdel, NJ.

Van Den Dool, "Image Processing Tools", "ESL", May 2004, p. 6, Publisher: Stellenbosch University, Faculty of Engineering, Published in Stellenbosch, South Africa.

Yan et al., "Automatic video logo detection and removal", "Multimedia Systems", Jul. 2005, p. 13 pgs, Publisher: Springer-Verlag 2005.

* cited by examiner

DETECTION AND INTERPOLATION OF STILL OBJECTS IN A VIDEO SEQUENCE

BACKGROUND OF THE INVENTION

1. Field of the Invention

The present disclosure relates generally to systems and methods for video processing, in particular, to detection and interpolation of still objects within a video sequence.

2. Description of the Related Art

Multimedia processing systems, such as video encoders, may encode multimedia data using encoding methods based on international standards such as MPEG-x and H.26x standards. Such encoding methods generally are directed to compressing the multimedia data for transmission and/or storage. Compression is broadly the process of removing redundancy from the data. In addition, video display systems may transcode or transform multimedia data for various purposes such as, for example, to ensure compatibility with display standards such as NTSC, HDTV, or PAL, to increase frame rate in order to reduce perceived motion blur, and to achieve smooth motion portrayal of content with a frame rate that differs from that of the display device. These transcoding methods may perform similar functions as the encoding methods for performing frame rate conversion, de-interlacing, etc.

A video signal may be described in terms of a sequence of pictures, which include frames (an entire picture), or fields (e.g., an interlaced video stream comprises fields of alternating odd or even lines of a picture). A frame may be generally used to refer to a picture, a frame, or a field. Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. Depending on context, a block may refer to either a macroblock, a subblock, or even a single pixel.

Video sequences may be received by a receiving device in a compressed format and subsequently decompressed by a decoder in the receiving device. Video sequences may also be received in an uncompressed state. In either case, the video sequence is characterized at least by a frame rate, and a horizontal and vertical pixel resolution. Many times, a display device associated with the receiving device may require a different frame rate and/or pixel resolution and video reconstruction of one or more video frames may be performed.

Reconstruction of video frames may comprise estimating a video frame between two or more already received (or received and decompressed) video frames. The reconstruction may involve techniques known as motion estimation and motion compensation. Matching portions of video frames between two or more already received (or received and decompressed) frames are identified along with a motion vector that contains the relative locations of the matching blocks in the process of motion estimation. These matching blocks and motion vectors are then used to reconstruct portions of the intermediate frame by the process of motion compensation. Frame rate conversion, de-interlacing, and transcoding are examples of processes where decoder devices create new video data based on already reconstructed video data. In addition, these motion compensation techniques can use encoded data, such as motion vectors and residual error, as well as the reconstructed video data for estimating the newly created frames.

Blocks containing a still object, but described by a non-zero motion vector, may present problems for standard motion compensation methods, however. A still object is an object which remains stationary within the video display, regardless of the other video within the frame. In one example, a television network logo may comprise a plurality of still pixels which form a still object. If the block is interpolated according to the motion vector in order to generate data for a frame between two or more already received frames, the still object may be erroneously moved along with the block instead of leaving it in place. Thus, artifacts may be introduced if standard motion compensation interpolation methods are directly used to interpolate the missing frame.

From the foregoing, then, there is a need for improved methods of estimating a video frame between already received frames when still objects are present in one or more of the received frames.

SUMMARY OF CERTAIN INVENTIVE ASPECTS

The systems and methods of the embodiments of the present disclosure each have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description of Certain Inventive Embodiments" one will understand how the sample features of this disclosure provide advantages that include detection and interpolation of still pixels between temporally adjacent frames of a video sequence.

In an embodiment, the present disclosure provides a method of detecting a still pixel between temporally adjacent frames F(t) and F(t−1) in a video sequence. The method comprises computing a difference between at least a portion of frames F(t) and F(t−1) containing a selected pixel over a selected time range. The method further comprises designating the selected pixel to be a still pixel candidate if the difference is less than a first selected threshold. The method additionally comprises raising a counter by one increment for each frame within the selected time range for which the selected pixel is designated as a still pixel candidate and lowering the counter by one increment for each frame within the selected time range for which the selected pixel is not designated as a still pixel candidate. The selected pixel is detected to be a still pixel if the counter is greater than a second selected threshold.

In another embodiment, the present disclosure provides a method of interpolating the pixel value of a selected pixel between temporally adjacent frames in a video sequence. The method comprises determining a motion vector for the selected pixel in a frame a which is a time a ahead of F(t−1), where at least one of the endpoint pixels of the motion vector in F(t), pixel D, and F(t−1), pixel E, is detected to be a still pixel. The method further comprises assigning a still level, S, which ranges between a first value and a second value, different than the first, to characterize the degree of stillness of the at least one still pixel, where the first value represents a substantially non-still pixel and the second value represents a substantially still pixel. The method additionally comprise adjusting the pixel value of the at least one still pixel as a function of its still level, where the pixel value of the selected pixel is calculated, at least in part, as a weighted average in α of the pixel values of the endpoint pixels D and E.

In a further embodiment, the present disclosure provides an apparatus for interpolation of a still pixel between temporally adjacent frames in a video sequence. The apparatus comprises a first component which detects at least one still pixel within at least one of a current frame F(t) and the prior frame F(t−1) and assigns a still level, S, which ranges between a first value and a second value, different than the first, to characterize the still level of the still pixel, where the first value represents a substantially non-still pixel and the second value represents a substantially still pixel. The apparatus further comprises a second component which interpolates the pixel value of a selected pixel in a frame α which is a time α ahead of F(t−1) by determining a motion vector for a selected pixel, where at least one endpoint of the motion vector in F(t), D, and F(t−1), E, is the still pixel, and adjusting the pixel value of the at least one still pixel as a function of S, where the pixel value of the selected pixel is calculated, at least in part, as a weighted average in α of the pixel values of the endpoints.

DETAILED DESCRIPTION OF CERTAIN INVENTIVE EMBODIMENTS

Embodiments of the present disclosure provide systems and methods for detection and interpolation of still pixels between already received frames of a video sequence. In certain embodiments, the method comprises detecting a still pixel within a current frame F(t) and assigning a still pixel value to the still pixel. This still pixel value may subsequently used in motion compensated interpolation, as well as motion compensated interpolations mixed with temporal interpolations. Methods are also provided for refinement of the detected still pixel candidates in order to remove pixels from the candidate list which can be handled properly by standard motion compensation interpolation techniques.

In one advantage, the still pixel detection and refinement algorithms provide robust identification of still pixels. Advantageously, in this manner, still pixels are not interpolated solely based upon the motion vector of the block to which they belong, reducing the likelihood of erroneous interpolation of the still pixel. Furthermore, the candidate refinement algorithms reduce the amount of unnecessary computation by removing still pixels, such as constant background pixels, which may be handled by standard methods, reserving the still pixel processing for those pixels which are likely not to be properly handled by these standard methods. These and other objects and advantages of the present disclosure are discussed in greater detail below.

Video signals may be characterized in terms of a series of pictures, frames, or fields. As used herein, "frame" is a term that may encompass either frames or fields of a progressive video signal or frames or fields of an interlaced video signal.

Figure 1:
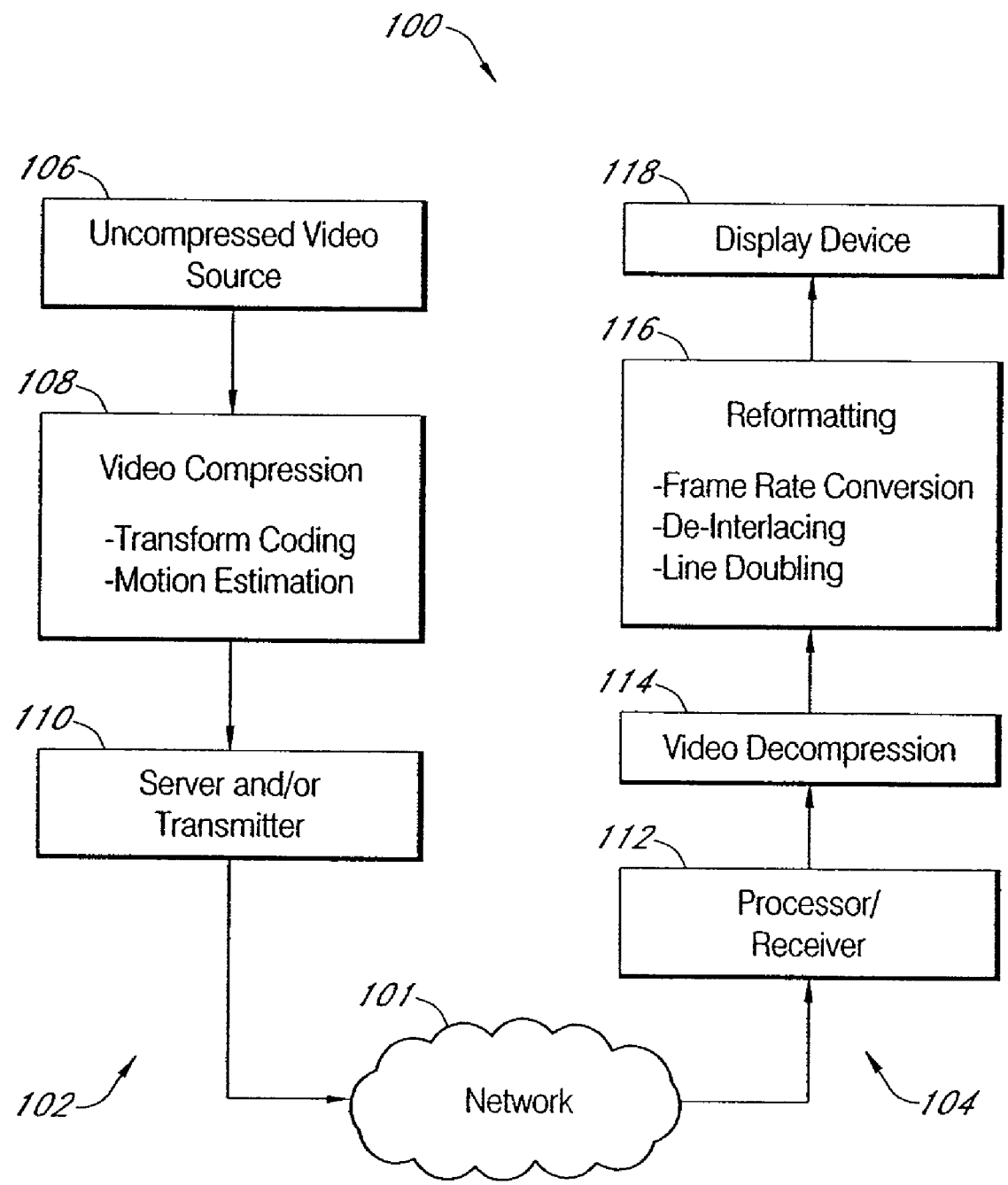
FIG. 1 is a functional block diagram of an exemplary video system for encoding and decoding of compressed digital video data, according to one embodiment of the system and method.

FIG. 1 illustrates a functional block diagram of an exemplary video system 100. The system 100 includes a video source 102 and video reception device 104. In this embodiment, the video source 102 obtains raw (uncompressed) video from an uncompressed video source 106, compresses it with a video compression element 108, and stores or communicates the compressed video data using a communication element 110. The video reception device 104 includes a processor and/or receiver 112, a video decompression element 114 and a reformatting subsystem 116. The compressed video can be communicated from the video source 102 to the video reception device 104 via a network 101.

The uncompressed video source 106 can be a video camera, or a memory device such as a disk drive. The uncompressed video source 106 provides uncompressed video data in the form of luminance and chrominance, or in individual color intensities such as red, green and blue, etc.

The video compression element 108 performs any of various video encoding techniques to remove the redundancy from the uncompressed video data. Transform coding may be used to remove higher spatial frequency components thereby removing spatial redundancy within a frame. Most video compression schemes involve a form of motion estimation such as block matching/motion compensated prediction or optical flow as well as others. The purpose of the motion estimation schemes is to remove the temporal redundancy between frames in a video sequence. Other forms of video compression known to skilled technologists may also be used in the video compression element 108.

The communication element 110 may be a server that is connected to the Internet and stores the compressed video. The communication element 110 may also be a transmitter that is configured to transmit the compressed video over the network 101. The network 101 may comprise one or more of a wireline or wireless communication system, including one or more of a Ethernet, telephone (e.g., POTS), cable, powerline, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1×EV-DO or 1×EV-DO Gold Multicast) system, an IEEE 802.11 system, a DMB (Digital Multimedia Broadcasting) system, an orthogonal frequency division multiple access (OFDM) system, or a DVB-H (Digital Video Broadcasting—Handheld) system.

The processor/receiver 112 of the video reception device 104 receives the compressed video over the network 101. In another embodiment, the processor/receiver accesses the compressed video from a memory storage device such as a DVD, a hard drive, a memory card, etc. The processor/receiver 112 can be included in a personal computer, a set top box, a handheld device, etc.

The video decompression element 114 decodes (e.g., decompresses) the received compressed video data. The video decompression element 114 reconstructs the video frames that were compressed in the encoding process. Reconstruction can include inverse transformation of transformed coefficients (e.g., discrete cosine transform (DCT), wavelet transform, etc.), reconstruction of spatially predicted data, and reconstruction of temporally predicted data. The video decompression element 114 can be part of the same device that contains the processor/receiver 112, or it can be a separate device. The video reception device 104 can be part of a set-top box, a DVD player, a PC, etc. In some embodiments, the video reception device 104 may receive uncompressed video (e.g., from the uncompressed video source 106). In these embodiments, the video decompression element 114 may be omitted.

The format of the reconstructed video output from the video decompression element 114 depends on the format that was encoded by the video encoder. For example, digital video formats can include different frame rates, different numbers of lines and rows of pixels, interlaced and non-interlaced, etc. For example, movies are typically produced at 24 fps (frames per second) format, NTSC is 30 frames per second, and PAL is 25 frames per second. The format may be interlaced or progressive. The reformatting subsystem 116 modifies the video signal to a format that fits the format of a display device 118 that is connected to the video reception device 104. The display device may be a television set (e.g., NTSC, PAL or HDTV), or a computer monitor running at frame rates such as 70 Hz, 75 Hz, 80 Hz, etc. The reformatting subsystem 116 may be part of the same device as the video decompression element 114 and/or the processor receiver 112. In some embodiments as discussed above, the video received by the video reception device 104 may be uncompressed video (e.g., from the uncompressed video source 106) and the video decompression element 114 is omitted. In these embodiments, the reformatting subsystem 116 reformats the uncompressed video.

The processes performed by the reformatting subsystem 116 can be very similar to the encoding schemes used to encode the compressed video data. Motion estimation/compensation can be used to create intermediate frames between reconstructed frames in order to enable frame rate conversion. Therefore, methods of spatial prediction and temporal prediction used in encoder devices can also be used in decoder devices for purposes of reformatting the video. The reformatting subsystem 116 can use reconstructed video data and/or compressed video data (e.g., motion vectors, residual error values, etc.) for performing the reformatting.

Figure 2:
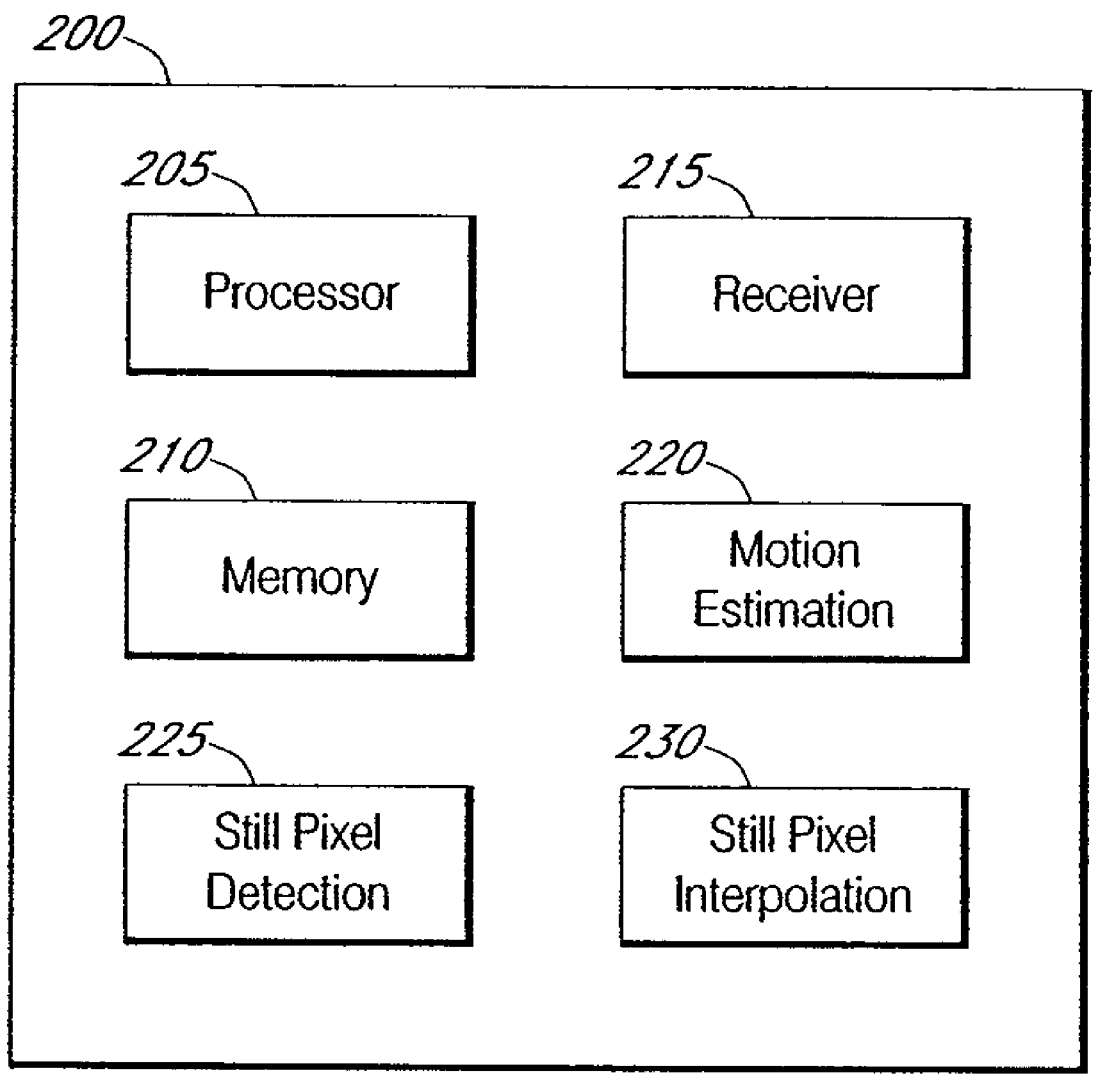
FIG. 2 is a block diagram illustrating an embodiment of a still pixel detection and interpolation system 200 that may be used as at least part of a reformatting subsystem of a video system such as illustrated in FIG. 1.

FIG. 2 is a block diagram illustrating an embodiment of a still pixel detection and interpolation system 200 that may be used as at least part of a reformatting subsystem of a video system such as illustrated in FIG. 1. In this embodiment, the system 200 comprises a processor component 205, a memory component 210, a receiver component 215, a motion estimation subsystem 220, a still pixel detection component 225, and a still pixel interpolation component 230. The processor 205 may include one or more of a general purpose processor and/or a digital signal processor and/or an application specific hardware processor. The memory 210 may include, for example, one or more of integrated circuits or disk based storage or any readable and writeable random access memory device. The processor 205 is coupled to the memory 210 and the other elements to perform the various actions of the other elements. The receiver 215 receives video data over the network 101. In other embodiments, the receiver 215 may be omitted and the video data may be retrieved from the memory element 210 or one or more external memory devices including memory discs, memory cards, internet server memory, etc. The video data received over the network 101, retrieved from the memory element 210, or from external memory devices may be compressed or uncompressed video data. In the case of compressed video data stored in the memory element 210 or in the external memory devices, the compressed video data may have been created at an earlier time by an encoding device such as the video source 102 in FIG. 1.

The motion estimation component 220 identifies portions of video that exhibit temporal redundancy from between two or more frames of video sequences as discussed above. The identified portions of video data containing temporal redundancy can be used to reconstruct new frames of video, such as done in frame rate conversion or de-interlacing. The portions of reference frames identified by the motion estimation subsystem 220 may be used, along with motion estimation data, such as motion vectors, either obtained from the encoded/compressed data or determined by the motion estimation subsystem 220, to construct other frames or portions of video data in reference to the reference frames. In one embodiment, a motion vector is used to locate a portion of an already reconstructed reference frame that is used to construct the portion of the other frame. In one aspect, a matching block of pixels in a second frame is identified by the motion estimation subsystem 220 for each block in a first frame. A residual error measurement such as a sum of absolute differences (SAD) or a mean square error (MSE) may be used to identify a matching reference portion, or portions, that may be used to construct other video frames.

The still pixel detection component 225 detects a still level of each pixel in the frame. If the detected still level is not about 0, indicating that the pixel possesses a level of stillness, a special interpolation procedure is performed by the still pixel interpolation component 230 to process the corresponding pixel, as discussed below. In general, for each pixel, the still pixel detection component performs a process of identifying possible still pixel candidates, refining the candidates to remove still pixel candidates which may be handled properly by standard motion interpolation procedures, and finalizing the selection of still pixels.

Subsequently, each still pixel is assigned a still pixel value for use in the novel interpolation methods performed by the still pixel interpolation component 230. In general, for a pixel A, to estimated in a frame $\alpha$ between frames $F(t)$ and $F(t-1)$, where t is time, a motion vector having endpoint pixels in frames $F(t)$ and $F(t-1)$ may be measured. In one embodiment, such measurement may be performed by the motion estimation component 220. It may be understood that a variety of methods of measuring motion vectors are known in the art, of which any may be used without departing from the spirit of the present disclosure. Depending on which of the endpoint pixels is a still pixel, different algorithms may be employed to estimate the pixel value of pixel A.

In some embodiments, one or more of the elements of the system 200 of FIG. 2 may be rearranged and/or combined. The elements may be implemented by hardware, software, firmware, middleware, microcode, or any combination thereof. Details of the actions performed by the elements of the still pixel detection and interpolation system 200 will be discussed in greater detail below.

Figure 3:
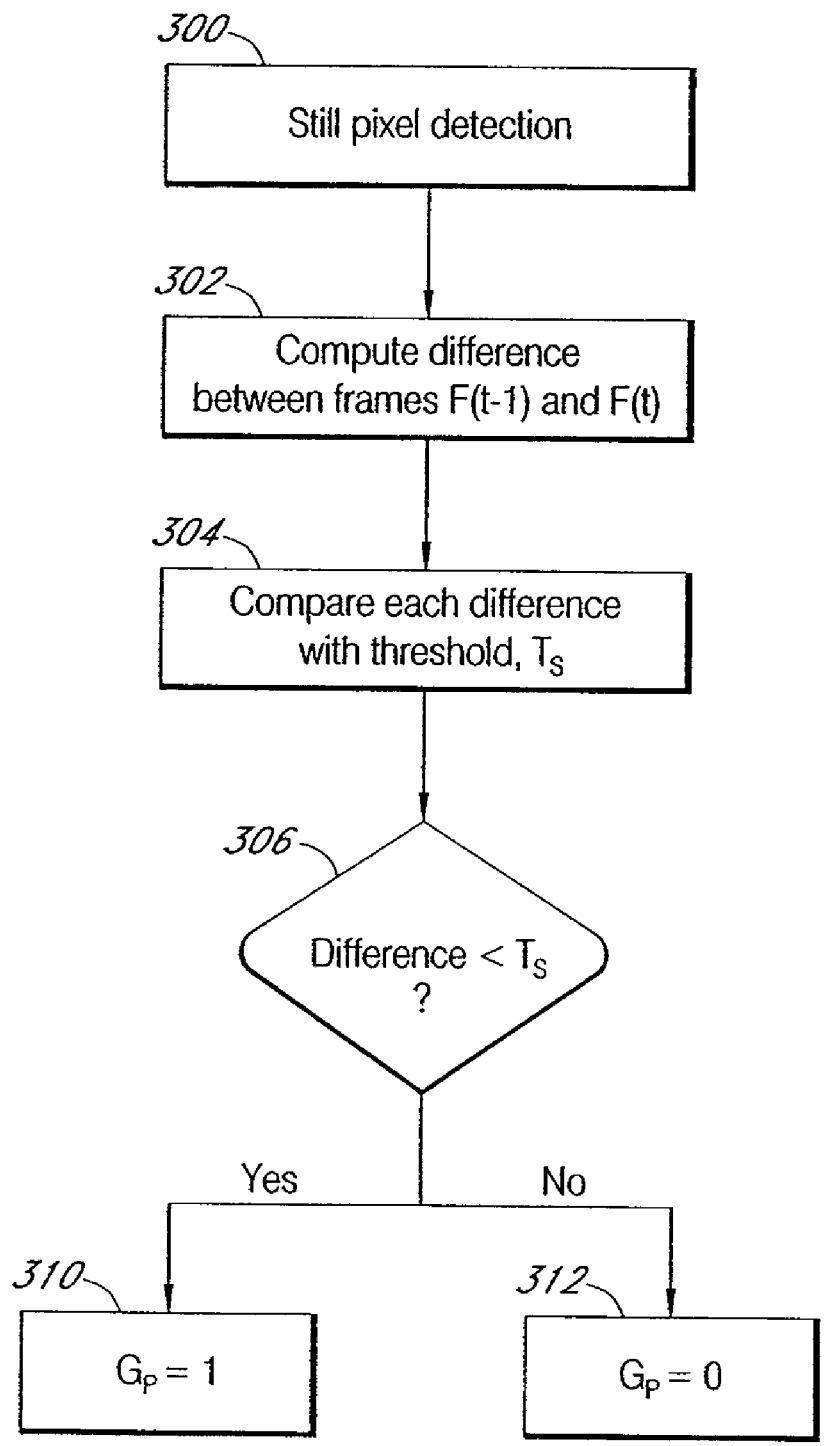
FIG. 3 is a flowchart illustrating a method of still pixel detection.

FIG. 3 presents a schematic illustration of one embodiment of a method of still pixel candidate detection 300 performed by the still pixel detection component 220. The method begins in Step 302 with a calculation of the difference between the temporally adjacent frames F(t) and F(t−1). The difference is calculated between a local window $W_1$, centered at a selected pixel in both F(t) and F(t−1).

In Step 304 and 306, the difference is compared to a selected threshold, $T_S$. If the difference is less than $T_S$, the pixel is determined to be a still pixel candidate. Conversely, if the difference is greater than $T_S$, the pixel is determined not to be a still pixel candidate. This criterion reflects that if a pixel is in motion, therefore exhibiting a large difference between the windows $W_1$ in frames F(t) and F(t−1), the difference is likely to be large. Thus, this criterion acts as a first, gross filtering mechanism for still pixel identification.

In certain embodiments, a flag, $G_p$, is set to one of a first and a second value, different from each other, depending on the outcome of the comparison in Step 306. For example, if the difference is less than $T_S$, $G_p$ is be set to 1 for the selected pixel (Step 310). Alternatively, if the difference is greater than $T_S$, $G_p$ is set to 0 for the selected pixel (Step 312). As discussed in greater detail below, $G_p$ acts as a reliability measure for the detection method 300, with values of 1 indicating confidence in the stillness of the pixel, and values of 0 indicating lack of confidence in the stillness of the pixel. $G_p$ values for the selected pixel are tallied in a final determination process to establish whether a pixel is still or not.

In one embodiment, the difference comprises a difference in intensities between the two frames F(t) and F(t−1). In further embodiments, the difference comprises a sum of absolute differences calculation. It may be understood, however, that a variety of methods of computing a difference between temporally adjacent frames are known in the art and that any one of these methods may be employed without departing from the spirit of the present disclosure.

Other methods of still pixel candidate detection may also be employed. In certain embodiments, a normalized cross-section approach may be employed, as described in U.S. patent application Ser. No. 11/766,666, entitled "System and Method for Still Object Detection Based on Normalized Cross Correlation", the entirety of which is hereby incorporated by reference.

The candidates so determined may subsequently refined in order to detect the still pixels which may require the still pixel interpolation of the present disclosure in order to be estimated properly in interpolation calculations. For example, pixels in constant background are typically detected as still pixel candidates according to the method 300 discussed above. These pixels can be typically handled correctly by standard motion compensated interpolation procedures. In one embodiment, the refinement may be performed on the basis of a standard deviation calculation to exclude these pixels. A standard deviation, σ, is calculated over a local window, $W_2$, of the selected pixel. If σ is less than a selected threshold, $T_\sigma$, the value of $G_p$ of the selected pixel is adjusted to zero. Otherwise, no change is made.

In an alternative embodiment, the candidate refinement may be performed on the basis of motion vectors. Block based motion estimation in frame rate conversion will detect a motion vector for each block in the frame. If the block to which the selected pixel belongs has a reliable motion vector, then the selected pixel is likely to be correctly handled by standard motion compensated interpolation and, thus, is not in need of the still pixel interpolation methods discussed below. Thus, if the motion vector is reliable, $G_p$ is adjusted to 0.

There are a variety of methods to detect if the motion vector is reliable. In one example, the motion vector is examined to determine if the motion vector is non-zero and whether it is associated with a small difference value, such as a sum of absolute differences. If the motion vector is non-zero and the associated SAD is smaller than a selected threshold, $T_e$, the motion vector is determined to be reliable and $G_p$ is adjusted to 0. Otherwise, the $G_p$ value is unchanged.

The candidate selection and refinement operations discussed above may be repeated for the pixels in the frames F(t) and F(t−1) over a selected time period. This iteration permits examination of the behavior of the pixels over time and determination of a $G_p$ value for each pixel at a variety of times.

After performing the candidate refinement procedure, the candidates are finalized. In order to improve the likelihood of achieving a reliable result, a counter, N, is assigned to each candidate pixel. If the adjusted value of $G_p$ is 1, then N is increased by 1, up to a maximum value, $N_{max}$, and if the adjusted value of $G_p$ is 0, then N is decreased by 1, to a minimum of 0. If N of the pixel, for all t examined, is greater than a selected threshold $T_N$, then the pixel is determined to be a still pixel. Conversely, if N of the pixel, for all t examined, is equal to or less than $T_N$, then the pixel is determined not to be a still pixel.

Figure 4:
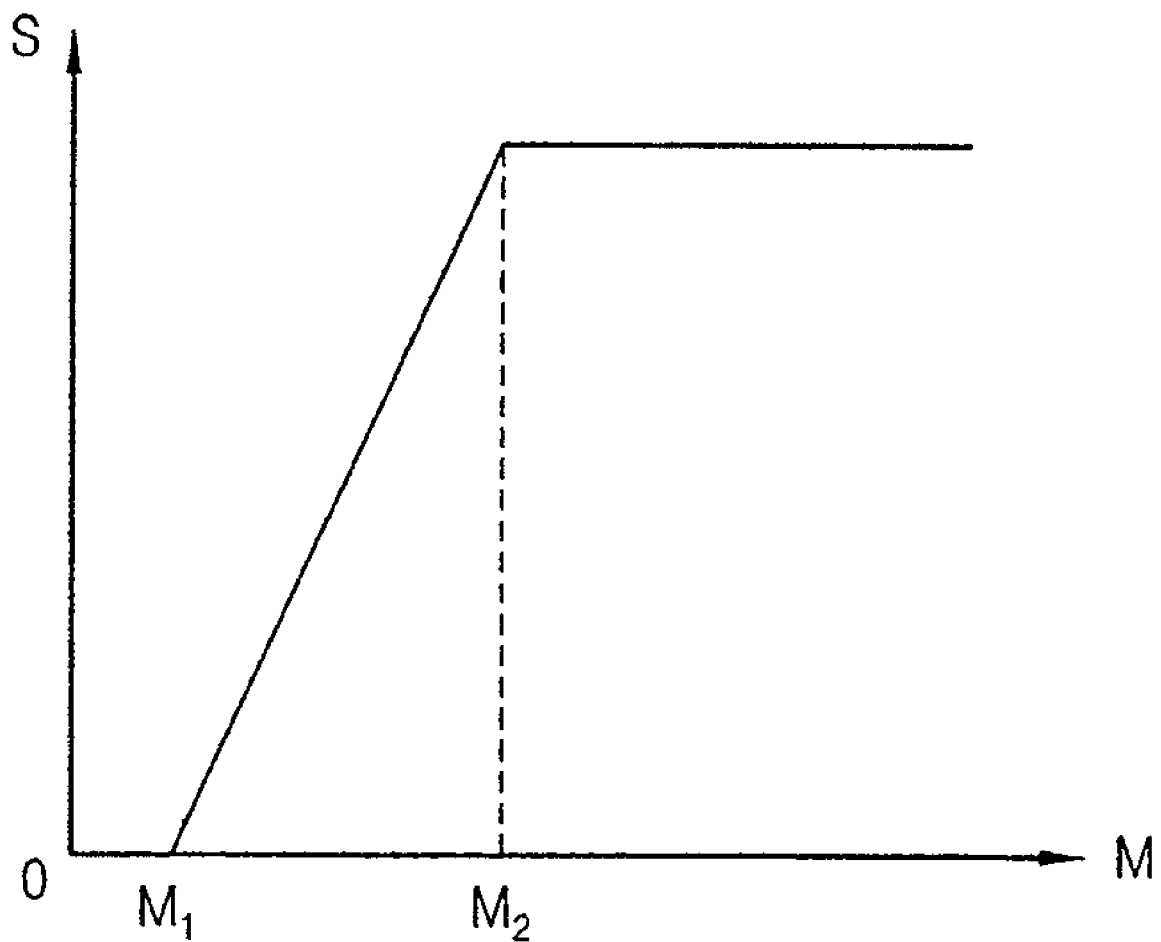
FIG. 4 is a schematic illustration of a method of performing a linear interpolation to establish a still pixel value for a selected pixel.

The still level, S, for still pixels is determined in the following manner. The number of still pixels, M, in a window, $W_3$, centered about a selected pixel, are counted. The level of S may be subsequently determined from a lookup table or graph. For example, FIG. 4 illustrates one embodiment of a correlation graph between M and S. In FIG. 4, S rises from 0 at a first selected threshold $M_1$ to 1 at and beyond a second selected threshold $M_2$. Between $M_1$ and $M_2$, S is linearly proportional to M. In certain embodiments, $M_1$ is a non-zero value, meaning that some still pixels with low number of still neighbors, substantially isolated still pixels, will be assigned a zero still value, despite their still status.

It may be understood that the linear relationship between S and M, illustrated in FIG. 4, is only one of a number of possible relationships. Examples of other types of relationships may include, but are not limited to, exponential, power-law, and logarithmic. The type of relationship may be tailored to the specific circumstances of the video processing, as necessary.

Upon determining the still pixels and their still level, this information may be used in interpolation of frames between already received frames of a video sequence. In the discussion below, it will be assumed that interpolation is taking place for a frame at time α, where α is the distance from the frame to be interpolated, frame α, and frame F(t−1). Let A be a selected pixel in frame α whose pixel value is to be interpolated and pixels B and C be the pixels at the same position in the current frame F(t) and the previous frame, F(t−1), respectively. Furthermore, let MV be the motion vector of pixel A and pixels D and E be the pixels at the two ends of the MV in the current frame F(t) and the previous frame F(t−1), respectively. It may be understood, that the motion vector may be estimated by any method understood by those of skill in the art, for example, using a motion estimation block technique.

Figure 5A:
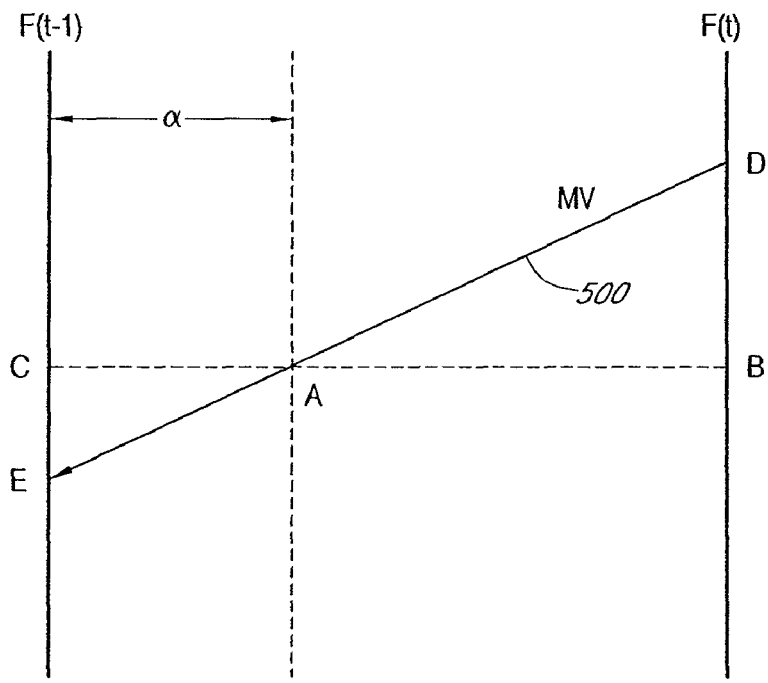
FIGS. 5A-5B present a motion vector diagram (5A) and a corresponding physical representation (5B) of a motion compensated interpolation using a standard motion vector analysis.
Figure 5B:
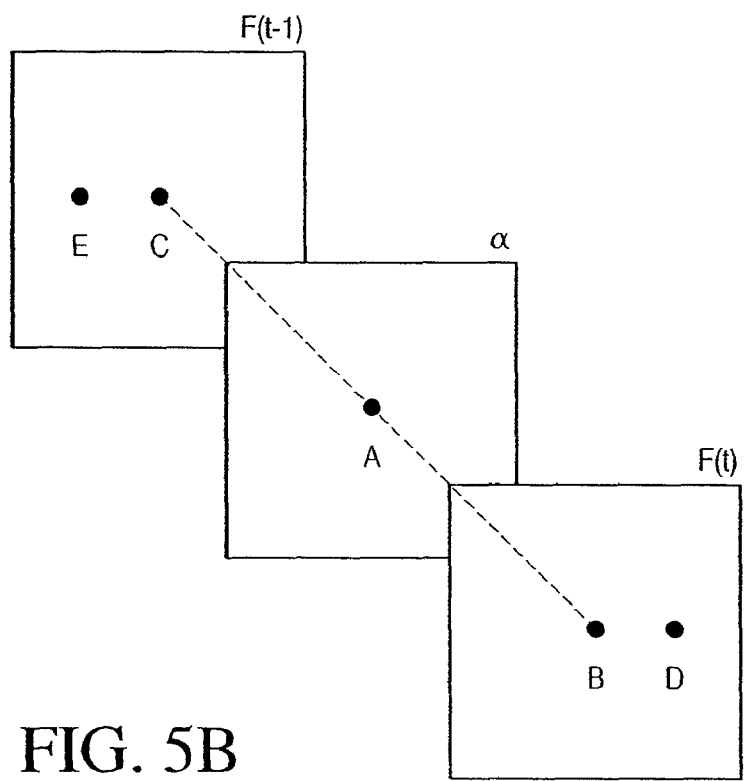

FIGS. 5A-5B schematically represent these conditions in a motion vector diagram (FIG. 5A) and a physical representation of the frames F(t), α, and F(t−1) (FIG. 5B). The motion vector diagram 500 of FIG. 5A plots a component of the motion vector of A, for example, the horizontal position of the motion vector on the vertical axis, with the time, ranging between F(t) and F(t−1), plotted on the horizontal axis (line 500). As illustrated in FIG. 5A, pixel D in frame F(t) is higher on the vertical axis than pixel E, meaning that pixel D is physically further to the left of pixel E (FIG. 5B). Pixels C and B are located between pixels E and D.

In the following discussion, methods of interpolating of the pixel value of pixel A, using the respective still values of pixels D, E, C, and B, will be presented. Case 1 addresses the situation where pixel D is a still pixel and pixel E is not. Case 2 addresses the case where pixel D is not a still pixel and pixel E is a still pixel. Case 3 addresses the case where pixel D and E are both still pixels. It may be understood that additional cases may be addressed using embodiments of the present disclosure without limit.

The pixel value of a selected pixel may comprise one or more pixel characteristics known in the art. Examples include, but are not limited to, luminance, chrominance, and individual color intensities such as red, green, or blue. It may be understood that, while certain pixel values and positions for pixels D, E, C, and B are selected for example purposes, the embodiments of the present disclosure are not limited by the selected pixel values or positions or the relative pixel values or relative positions.

Case 1: Pixel D is a Still Pixel

Figure 6A:
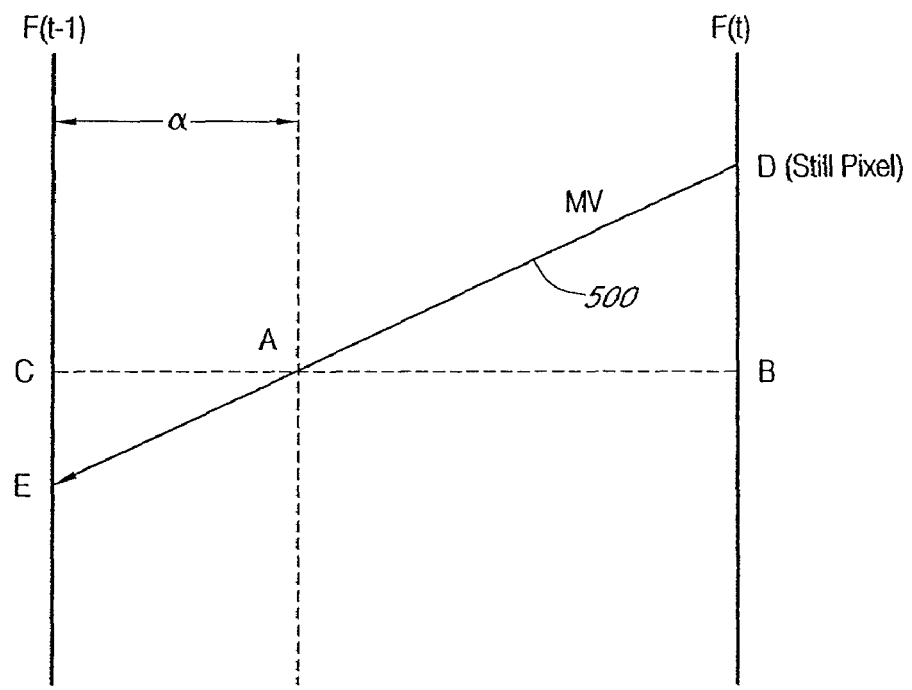
FIGS. 6A-6C present a motion vector diagram (6A) and pixel value diagrams (6B, 6C) for interpolation of the pixel value of a pixel A in a frame α between frames F(t−1) and F(t), where a pixel D in frame F(t) is a still pixel.
Figure 6B:
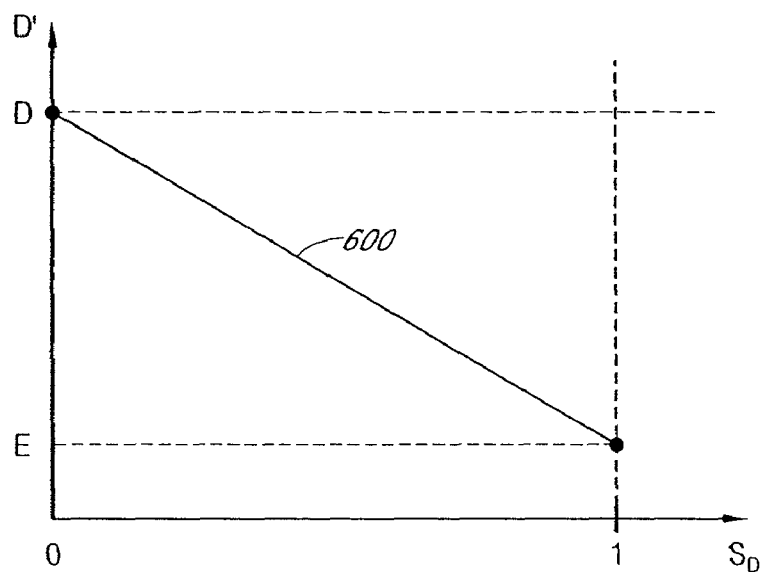
Figure 6C:
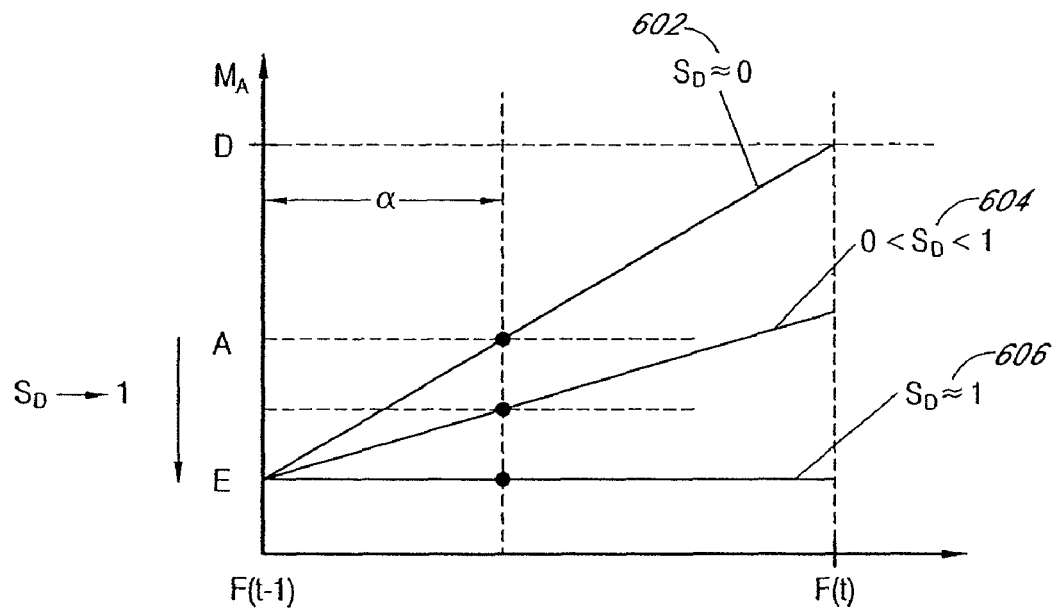

FIGS. 6A-6C present motion vector and pixel value diagrams for Case 1. As illustrated in motion vector diagram of FIG. 6A, pixel D is a still pixel having a still level $S_D$ and a pixel value D, while pixel E is not a still pixel and possesses a pixel value E.

To account for the effect that the still nature of pixel D has upon the interpolation of the pixel value of pixel A, a two step calculation is performed. First, the pixel value of pixel D is adjusted to yield a modified pixel value D' according to Equation (1):

$$D'=E*S_D+D*(1-S_D) \quad \text{(Eq. 1)}$$

which is a weighted average of the pixel values E and D on $S_D$. Next, the pixel value of pixel A, $M_A$, is calculated using D' according to Equation (2):

$$M_A=D'*\alpha+E*(1-\alpha) \quad \text{(Eq. 2)}$$

which is a weighted average of pixel values D' and E on $\alpha$.

FIG. 6B presents a pixel value diagram which illustrates the value of D' according to Equation 1 as a function of $S_D$ (line 600). From Equation (1), it can be seen that in the limit as $S_D \rightarrow 0$, the modified pixel value D' approaches pixel value D. Physically, this indicates that, as pixel D becomes less still, the modified pixel value D' approaches pixel value D. Conversely, in the limit as $S_D \rightarrow 1$, the modified pixel value D' approaches pixel value E. Physically, this condition indicates that, as pixel D becomes more still, its modified pixel value, D', is adjusted away from pixel value D, becoming approximately equal to pixel value E when pixel D is a fully still pixel.

The change in $M_A$ with the modified pixel value D' is illustrated in FIG. 6C, which plots $M_A$ as a function of frame time for three conditions: $S_D \approx 0$, $S_D \approx 1$, and $0 < S_D < 1$. As $M_A$ is a weighted average of the pixel values E and D' on $\alpha$, according to Equation (2), $M_A$ will vary between the pixel values D' and E for any $\alpha$.

When $S_D$ is approximately equal to 0, the modified pixel value D' is approximately equal to D, as discussed above. Therefore, $M_A$ varies between E and D (line 602) capturing the result expected for a pixel which is substantially not still.

When $S_D$ is approximately equal to 1, the modified pixel value D' is approximately equal to E, as discussed above. As a result, $M_A$ varies between E and E. That is to say, $M_A$ is approximately constant for all $\alpha$, with a value of E (line 606).

When $S_D$ is approximately between 0 and 1, the modified pixel value D' ranges between E and D, as discussed above. Examining FIG. 6C, it can be seen that the interpolated value of pixel A lies between the results obtained for $S_D$ approximately equal to 0 and 1, lines 602 and 606 of FIG. 6C. In one example, this result is illustrated in line 604.

Further insight into the interpolated pixel value of pixel A can be obtained by comparing the interpolated pixel values at a single value of $\alpha$. As illustrated in FIG. 6C, as $S_D \rightarrow 1$, because D' moves closer to E, the pixel value of A moves closer towards E for a given $\alpha$. This motion towards E continues until, at the limit of $S_D=1$, A=E.

Case 2: E is a Still Pixel

Figure 7A:
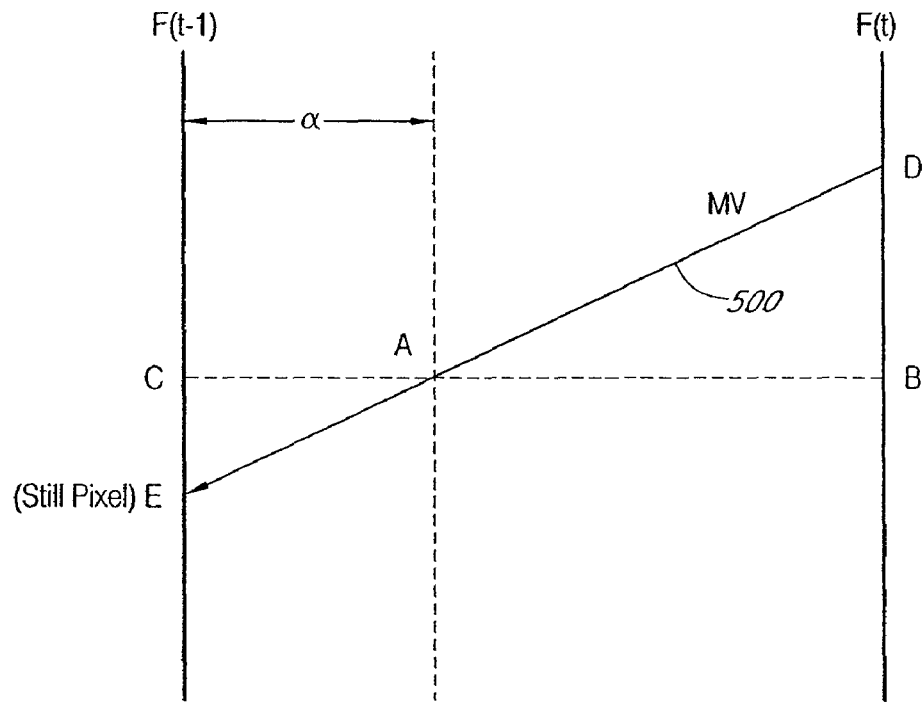
FIGS. 7A-7C present a motion vector diagram (7A) and pixel value diagrams (7B, 7C) for interpolation of the pixel value of a pixel A in α frame a between frames F(t−1) and F(t), where a pixel E in frame F(t−1) is a still pixel.
Figure 7B:
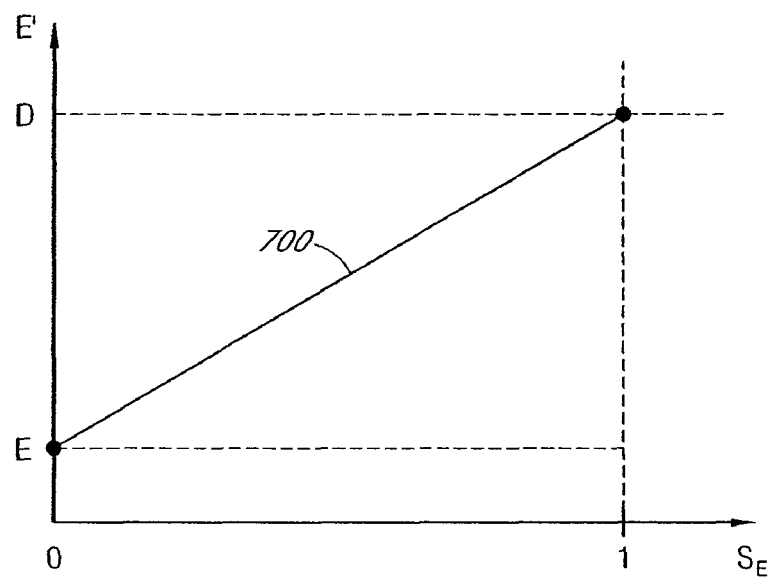
Figure 7C:
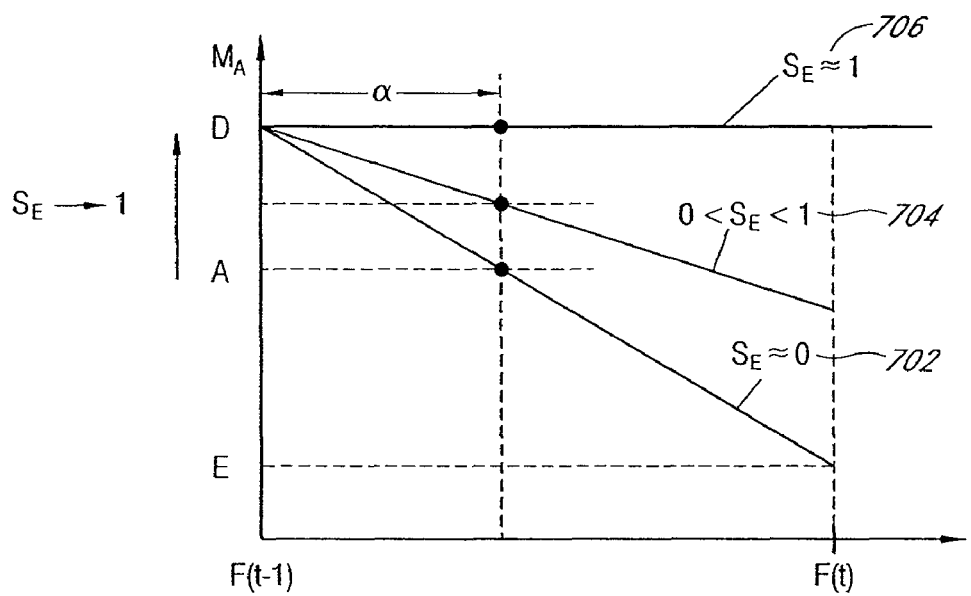

An analysis similar to that conducted above in Case 1 can be applied to Case 2. FIGS. 7A-7C illustrate a second case in which pixel E is a still pixel having a still level $S_E$, while pixel D is not a still pixel. E is adjusted to a value E' according to Equation (3):

$$E'=D*S_E+E*(1-S_E) \quad \text{(Eq. 3)}$$

which is a weighted average of D and E on $S_E$. The motion compensated interpolated value of A is given by $M_A$, calculated by Equation (4):

$$M_A=D*\alpha+E'*(1-\alpha) \quad \text{(Eq. 4)}$$

which is a weighted average of D and E' on $\alpha$.

FIG. 7B presents a pixel value diagram which illustrates the value of E' according to Equation 3 as a function of $S_E$ (line 700). From Equation (3), it can be seen that in the limit as $S_E \rightarrow 0$, the modified pixel value E' approaches pixel value E. Physically, this indicates that, as pixel E becomes less still, the modified pixel value E' approaches pixel value E. Conversely, in the limit as $S_E \rightarrow 1$, the modified pixel value E' approaches pixel value D. Physically, this condition indicates that, as pixel E becomes more still, its modified pixel value, E', is adjusted away from pixel value E, becoming approximately equal to pixel value D when pixel E is a fully still pixel.

The change in $M_A$ with the modified pixel value E' is illustrated in FIG. 7C, which plots $M_A$ as a function of frame time for three conditions: $S_E \approx 0$, $S_E \approx 1$, and $0 < S_E < 1$. As $M_A$ is a weighted average of the pixel values E' and D on $\alpha$, $M_A$ will vary between the pixel values E' and D for any $\alpha$.

When $S_E$ is approximately equal to 0, the modified pixel value E' is approximately equal to E, as discussed above. Therefore, $M_A$ varies between E and D (line 702) capturing the result expected for a pixel which is substantially not still.

When $S_E$ is approximately equal to 1, the modified pixel value E' is approximately equal to D, as discussed above. As a result, $M_A$ varies between D and D. That is to say, $M_A$ is approximately constant for all $\alpha$, with value of D (line 706).

When $S_D$ is approximately between 0 and 1, the modified pixel value E' ranges between E and D, as discussed above. Examining FIG. 7C, it can be seen that the interpolated value of pixel A lies between the results obtained $S_E \approx 0$ (Line 702) and $S_E \approx 1$ (Line 706). In one example, this result is illustrated in Line 704.

Further insight into the interpolated pixel value of pixel A can be obtained by comparing the interpolated pixel values at a single value of $\alpha$. As illustrated in FIG. 7C, it can be seen that the interpolated value of pixel A lies between the results obtained for $S_E$ approximately equal to 0 and 1, lines 702 and 706 of FIG. 6C. In one example, this result is illustrated in line 704.

Case 3: E and D are Still Pixels

FIGS. 8A-8E illustrate a third case in which pixels E, D, and, optionally, pixel B are still pixels having still levels $S_E$, $S_D$, and $S_B$, respectively. As discussed in greater detail below, the interpolated pixel value of pixel A is determined by first calculating modified pixel values E' and D' for pixels E and D, then performing a motion compensated interpolation on $\alpha$ to determine the interpolated pixel value of pixel A. In the event that pixel B is a still pixel, a further interpolation, on $S_B$ of the modified pixel values E' and D' is employed to determine the interpolated pixel value of pixel A.

Pixel values D and E are adjusted to values D' and E' according to Equations (5), (6), and (7):

$$T = B^* \alpha + C^*(1-\alpha) \quad \text{(Eq. 5)}$$

$$D' = T^* S_D + D^*(1-S_D) \quad \text{(Eq. 6)}$$

$$E' = T^* S_E + E^*(1-S_E) \quad \text{(Eq. 7)}$$

As illustrated in Equation (5), pixel value T comprises a weighted average of the pixel values of pixels B and C on α. Equations 6 and 7 illustrate that the modified pixel values D' and E', in this case, are weighted averages of the pixel values of T and D or T and E on $S_D$ and $S_E$, respectively.

The motion compensated interpolated value of A is given by $M_A$, calculated by the Equation (8):

$$M_A = D'^* \alpha + E'^*(1-\alpha) \quad \text{(Eq. 8)}$$

which is a weighted average of D' and E' on α.

Figure 8A:
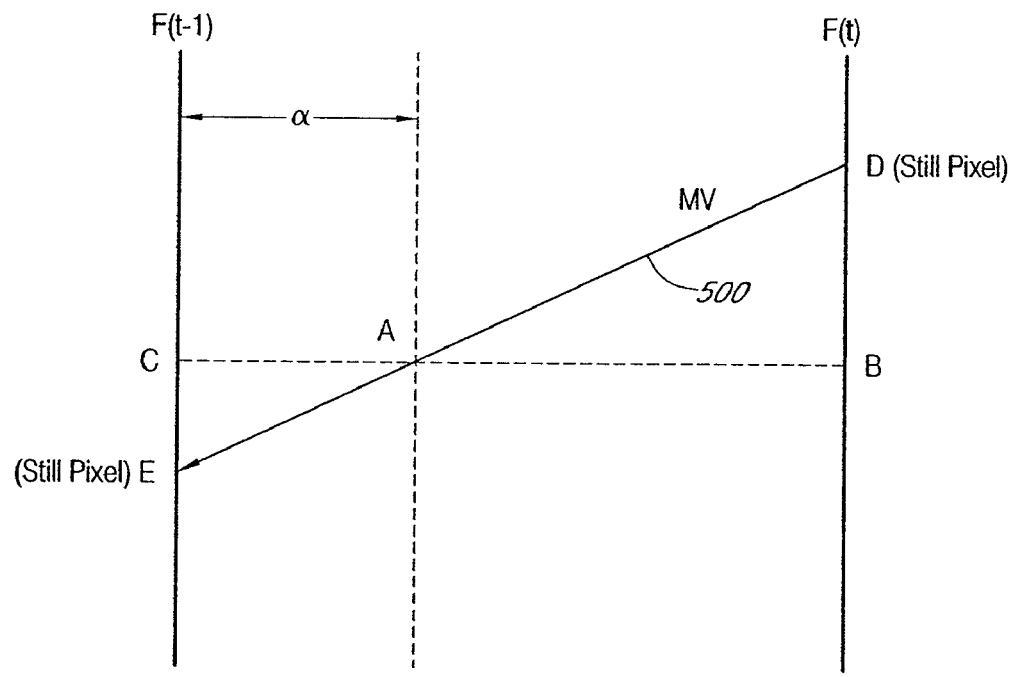
FIGS. 8A-8E present a motion vector diagram (8A) and pixel value diagrams (8B, 8C, 8D, 8E) for interpolation of the pixel value of a pixel A in a frame α between frames F(t−1) and F(t), where pixels D and E in frames F(t) and F(t−1) are still pixels.
Figure 8B:
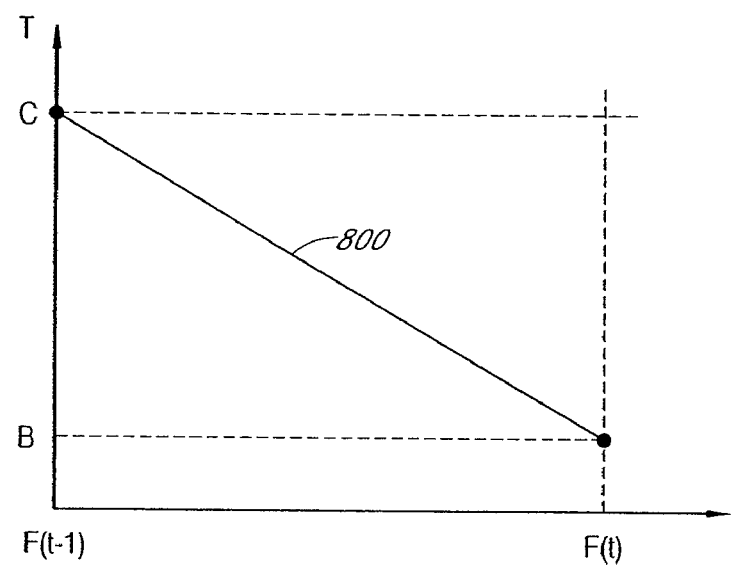

FIG. 8B presents a pixel value diagram which illustrates the pixel value T according to Equation 5 as a function α (line 800). It can be seen that in the limit of α→0, the pixel value T approaches pixel value C, while in the limit as α→1, the pixel value T approaches pixel value B.

Figure 8C:
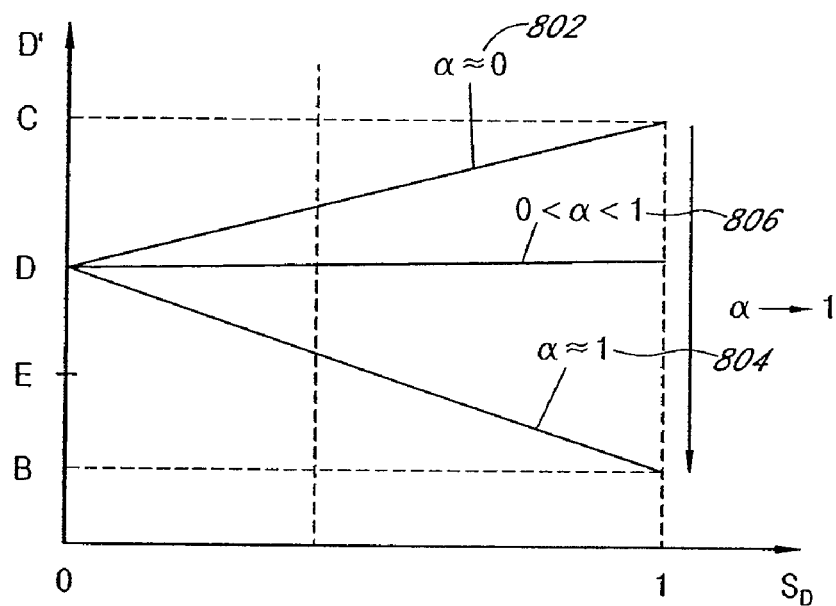

FIG. 8C presents a pixel value diagram which illustrates the pixel value of D' according to Equation (6) as a function of $S_D$. From Equation (6), it can be seen that in the limit of $S_D$→0, the modified pixel value D' approaches pixel value D. Physically, this indicates that, in the limit of pixel D as a substantially non-still pixel, the modified pixel value D' remains substantially unchanged from the pixel value D.

Conversely, in the limit as $S_D$→1, the modified pixel value D' approaches pixel value T. Furthermore, from Equation (5) and FIG. 8B, it can be understood that pixel value T varies between pixel values C and B as α varies between 0 to 1. Thus, for α→0, D' varies between about D and C for all $S_D$ (line 802), while for α→1, D' varies between about D and B (line 804). For values of α lying between 0 and 1, D' varies between about pixel values D, B, and C (line 806). Physically, these limiting condition indicate that, as pixel D becomes more still, the modified pixel value D' is adjusted away from pixel value D to lie between about pixel values B and C, with exact value of D' depending upon the assumed values of α and $S_D$.

Figure 8D:
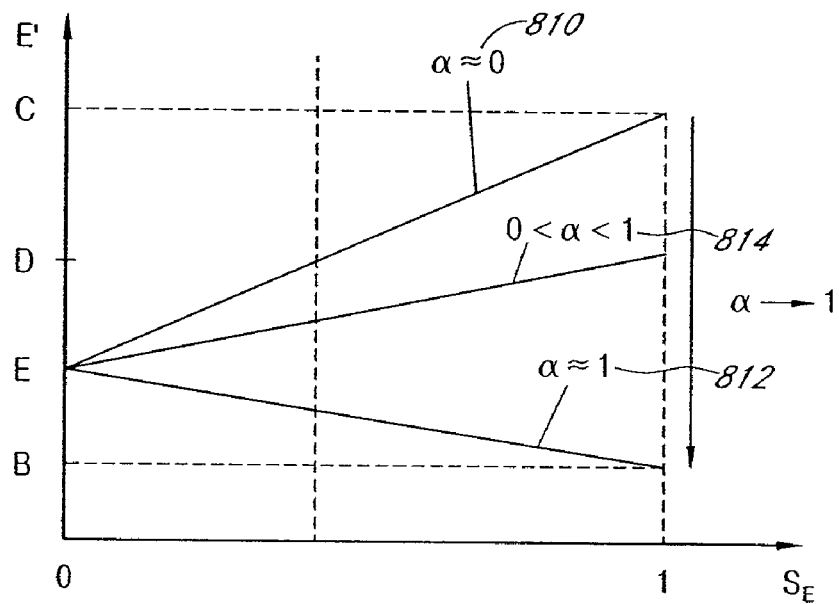

FIG. 8D presents a pixel value diagram which illustrates the value of E' according to Equation (7) as a function of $S_E$. From Equation (7), it can be seen that in the limit of $S_E$→0, the modified pixel value E' approaches pixel value E. Physically, this indicates that, in the limit of pixel E as a substantially non-still pixel, the modified pixel value E' remains substantially unchanged from about the pixel value E.

Conversely, in the limit as $S_E$→1, the modified pixel value E' approaches pixel value T. Furthermore, from Equation (7) and FIG. 8B, it can be understood that pixel value T varies between pixel values C and B as α varies between 0 to 1. Thus, for α→0, E' varies between E and C for all $S_E$ (line 810), while for α→1, E' varies between E and B (line 812). For values of α lying between 0 and 1, E' varies between pixel values E, B, and C (line 814). Physically, these limiting conditions indicate that, as pixel E becomes more still, its modified pixel value, E', is adjusted away from pixel value E, lying between pixel values B and C, the exact pixel value depending upon the assumed values of α and $S_E$.

The change in $M_A$ with the modified pixel values D' and E' is given in accordance with Equation (8). $M_A$ is a weighted average of the pixel values E' and D' on α, which, as discussed above, means that $M_A$ is a function of α, $S_E$, and $S_D$.

To examine the behavior of $M_A$, it is useful to consider the values of $M_A$ resulting from variation in α, $S_E$, and $S_D$ in the limits as each parameter varies between about 0 to 1. These limiting results are presented in Table I and summarized in FIG. 8E.

TABLE I

Pixel values of $M_A$ in limiting cases

| Example | α | $S_D$ | $S_E$ | T | D' | E' | $M_A$ |
|---|---|---|---|---|---|---|---|
| 1 | 0 | 0 | 0 | C | D | E | E |
| 2 | 0 | 1 | 0 | C | C | E | E |
| 3 | 0 | 0 | 1 | C | D | C | C |
| 4 | 0 | 1 | 1 | C | C | C | C |
| 5 | 1 | 0 | 0 | B | D | E | D |
| 6 | 1 | 1 | 0 | B | B | E | B |
| 7 | 1 | 0 | 1 | B | D | B | D |
| 8 | 1 | 1 | 1 | B | B | B | B |

It can be seen from Table I that the pairs of Examples 1 and 5, 2 and 6, 3 and 7, and 4 and 8 are complements to each other in the limits as α approaches 0 and 1.

Examples 1 and 5 illustrate that $M_A$ varies between about E and D (line 816). This result arises because $S_D$ and $S_E$ are both approximately equal to 0. According to Equations (6) and (7), in the limit as $S_D$, $S_E$ →0, the modified pixel values D' and E' pixel value are approximately equal to pixel values D and E, respectively. From Equation (8), we see that $M_A$ is a weighted average on α between D' and E'. Thus, $M_A$ varies between about pixel values D and E.

Examples 2 and 6 illustrate that $M_A$ varies between about E and B (line 820). This result arises because $S_D$ is approximately equal to 1, while $S_E$ is approximately equal to 0. According to Equation (6), in the limit as $S_D$<1, the modified pixel value D' is approximately equal to T. As discussed above, in the limit as $S_E$ →0, the modified pixel value E' is approximately equal to E. According to Equation (8), in the limit of α→0, $M_A$ approaches E', while in the limit of α→1, $M_A$ approaches D'. Thus, as E' is approximately E as α→0 and D' is approximately B as α→1, $M_A$ varies between about pixel values E and B.

Examples 3 and 7 illustrate that $M_A$ varies between about C and D (line 822). This result arises because $S_D$ is approximately equal to 0, while $S_E$ is approximately equal to 1. According to Equation (6), in the limit as $S_D$ →0, modified pixel value D' is approximately equal to D. Further, according to Equation (7), in the limit as $S_E$ →1, the modified pixel value E' is approximately equal to T. Additionally, according to Equation (8), in the limit of α→0, $M_A$ approaches E', while in the limit of α→1, $M_A$ approaches D'. Thus, as E' is approximately C as α→0 and D' is approximately D as α→1, $M_A$ varies between about pixel values C and D.

Examples 4 and 8 illustrate that $M_A$ varies between about C and B (line 822). This result arises because $S_D$ and $S_E$ are approximately equal to 1. According to Equation (6), in the limit as $S_D$, $S_E$ →1, modified pixel values E' and D' are approximately equal to T. Thus, $M_A$ varies between about pixel values C and B.

Figure 8E:
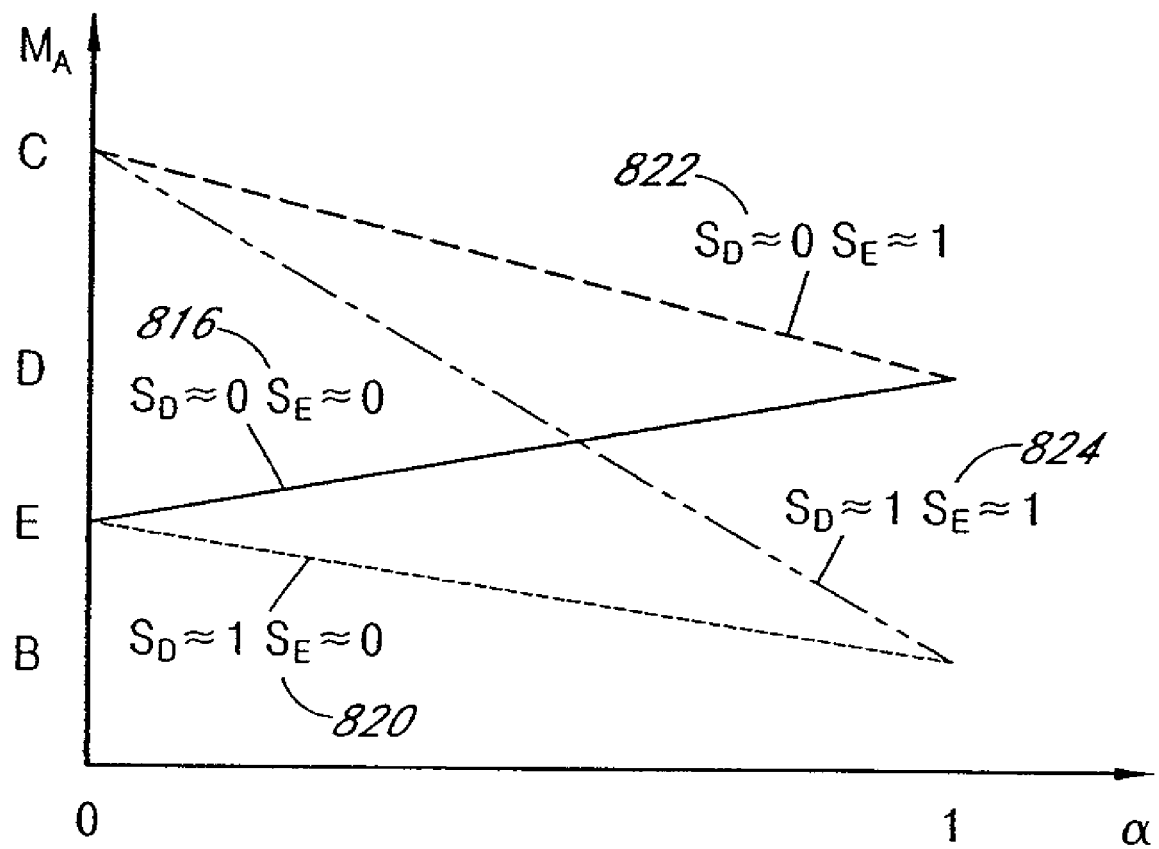

It may be understood that intermediate values of $S_D$ and $S_E$ result in values of $M_A$ which lie between lines 816, 820, 822, and 824 of FIG. 8E. In one example, keeping $S_D$ constant at about 0 and varying $S_E$ between 0 and 1 results in $M_A$ values which lie between lines 816 and 822. In another example, keeping $S_E$ constant at about 1, varying $S_D$ between 0 and 1 results in $M_A$ values which lie between the lines 822 and 824.

In the event that pixel B in the current frame F(t) is detected as a still pixel with still level $S_B$, the motion compensated result, $M_A$, and the temporal interpolation result, T, discussed above with respect to Examples 1-4 are mixed to provide the interpolated pixel value of pixel A. $M_A$ is determined as above according to Equations (5)-(8) for the various possible combinations of the still level of pixels D and E and the interpolated pixel value of pixel A is given by $I_A$:

$$I_A = T^* S_B + M_A^* (1-S_B) \quad \text{(Eq. 9)}$$

where $I_A$ is a weighted average of T and $M_A$ on $S_B$. In the limit as $S_B \rightarrow 0$, $I_A$ is approximately equal to $M_A$ and the results of Table I and FIG. 8E are recovered. In the limit as $S_B \rightarrow 1$, $I_A$ is approximately equal to T, and the results of FIG. 8B are recovered.

Thus, the embodiments of the present disclosure provide systems and methods for detecting still pixels, establishing a still pixel level for each still pixel, and using that still pixel level in order to provide a revised interpolation procedure for determining the pixel value of a selected pixel at a frame a distance α from frame F(t−1), such as pixel A described above.

Advantageously, the disclosed methods provide significant discriminating capability in detection of the still pixels. Still pixel candidates are subjected to a refinement process, where pixels that may be properly handled by standard motion compensation interpolation techniques, such as pixels in constant background or pixels with reliable motion vectors, are eliminated from consideration. This refinement may reduce the total number of still pixels which are interpolated using the still pixel interpolation methods, reducing the total processing capability necessary to perform such still pixel interpolations. Furthermore, reliability checking such as flagging certain pixels as high likelihood and low likelihood still pixel candidates, $G_p=1$ and $G_p=0$, respectively, further enhances confidence in the detected still pixels.

In further advantage, the disclosed methods of still pixel interpolation are capable of providing motion compensated interpolation results for a wide variety of circumstances. Examples include cases of motion compensated interpolation when the endpoints of the motion vector of pixel A (e.g. pixels D and E) vary between substantially still and substantially not still. Further examples include cases involving mixtures of temporal and motion compensation interpolation when the motion vector endpoint pixels are substantially still and at least one of the pixels at the physical position of pixel A in frames F(t−1) and F(t) are still (e.g. pixel B), such as Case 3 above. Thus, through use of these methods, still pixels may be substantially better interpolated than through standard motion compensated interpolation procedures, producing a display with fewer errors.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of interpolating the pixel value of a selected pixel between temporally adjacent frames in a video sequence, comprising:
   determining a motion vector for the selected pixel in a frame a which is a time a ahead of F(t−1), wherein at least one of the endpoint pixels of the motion vector in F(t), pixel D, and F(t−1), pixel E, is detected to be a still pixel;
   assigning a still level, S, which ranges between a first value and a second value, different than the first, to characterize the degree of stillness of the at least one still pixel, wherein the first value represents a substantially non-still pixel and the second value represents a substantially still pixel; and
   adjusting the pixel value of the at least one still pixel as a function of its still level;
   wherein the pixel value of the selected pixel is calculated, at least in part, as a weighted average in a, of the pixel values of the endpoint pixels D and E.

2. The method of claim 1, wherein detecting a still pixel comprises: computing a difference between at least a portion of frames F(t) and F(t−1) containing a chosen pixel over a selected time range;
   designating the chosen pixel to be a still pixel candidate if the difference is less than a first selected threshold; and
   raising a counter by one increment for each frame within the selected time range for which the chosen pixel is designated as a still pixel candidate and lowering the counter by one increment for each frame within the selected time range for which the chosen pixel is not designated as a still pixel candidate;
   wherein the chosen pixel is determined to be a still pixel if the counter is greater than a second selected threshold.

3. The method of claim 2, wherein a still pixel candidate is excluded from further consideration by measuring a standard deviation over at least a selected portion of the frames containing the candidate pixel and excluding those candidate pixels having a standard deviation less than a third selected threshold.

4. The method of claim 2, wherein a still pixel candidate is excluded from further consideration by estimating a motion vector for a block containing the still pixel candidate and excluding the candidate pixel if the motion vector is reliable.

5. The method of claim 4, wherein the motion vector is reliable if the motion vector is non-zero and the difference is less than a fourth selected threshold.

6. The method of claim 1, wherein the motion vector endpoint in F(t), pixel D, is detected as a still pixel and wherein the pixel value of the selected pixel, MA is calculated as a weighted average on a of an adjusted pixel value of pixel D, D', and the pixel value of the motion vector endpoint in F(t−1), pixel E.

7. The method of claim 6, wherein the pixel value of the selected pixel is calculated by:

$$M_A = D'^* \alpha + E^* (1-\alpha).$$

8. The method of claim 1, wherein the motion vector endpoint in F(t−1), pixel E, is detected as a still pixel and wherein the pixel value of the selected pixel, $M_A$ is calculated as a weighted average on a of an adjusted pixel value of the pixel E, E', and a pixel value of the motion vector endpoint in F(t), pixel D.

9. The method of claim 8, wherein the pixel value of the selected pixel is calculated by:

$$M_A = D^* \alpha + E'^* (1-\alpha).$$

10. The method of claim 1, wherein a pixel value temporal interpolation, T, comprises a weighted average on a of the pixel values of a pixel B and a pixel C, where pixels B and C are at about the same position in frames F(t) and F(t−1) as the selected pixel in frame α.

11. The method of claim 10, wherein the motion vector endpoint in F(t) and F(t1), pixels D and E, respectively, are detected as still pixels and wherein the adjusted pixel value of pixel D, D', is given by a weighted average, on the still value of pixel D, of the pixel values of pixels T and D, and wherein the adjusted pixel value of pixel E, E', is given by a weighted average on the still value of pixel E of the pixel values of pixels T and E.

12. The method of claim 11, wherein the pixel value of the selected pixel, $M_A$, is calculated as a weighted average on a of the adjusted pixel value of E, E', and the adjusted pixel value of D, D'.

13. The method of claim 12, wherein the pixel value of the selected pixel is calculated by:

$$M_A = D'^* \alpha + E'^*(1-\alpha).$$

14. The method of claim 13, wherein the pixel B in frame F(t) is detected to be a still pixel having a still level, $S_B$, and wherein a revised pixel value of the selected pixel, $I_A$, is calculated as a weighted average on $S_B$ of the pixel values of T and $M_A$.

15. The method of claim 14, wherein the pixel value of the selected pixel, $I_A$ is calculated by:

$$I_A = T^* S_B + M_A^*(1-S_B).$$

16. The method of claim 1, wherein the difference comprises difference in intensity of the frames F(t) and F(t−1).

17. The method of claim 1, wherein the pixel values comprise at least one of luminance, chrominance, and individual color intensities such as red, green and blue.

18. An apparatus for interpolation of a still pixel between temporally adjacent frames in a video sequence, comprising:
a first component which detects at least one still pixel within at least one of a current frame F(t) and the prior frame F(t−1) and assigns a still level, S, which ranges between a first value and a second value, different than the first, to characterize the still level of the still pixel, wherein the first value represents a substantially non-still pixel and the second value represents a substantially still pixel; and
a second component which interpolates the pixel value of a selected pixel in a frame αwhich is a time a ahead of F(t−1) by determining a motion vector for a selected pixel, wherein at least one endpoint of the motion vector in F(t), D, and F(t1), E, is the still pixel, and adjusting the pixel value of the at least one still pixel as a function of S, wherein the pixel value of the selected pixel is calculated, at least in part, as a weighted average in a of the pixel values of the endpoints.

19. The apparatus of claim 18, wherein the first component is for:
computing a difference between at least a portion of frames F(t) and F(t−1) containing a chosen pixel over a selected time range;
designating the chosen pixel to be a still pixel candidate if the difference is less than a first selected threshold; and
raising a counter by one increment for each frame within the selected time range for which the chosen pixel is designated as a still pixel candidate and lowering the counter by one increment for each frame within the selected time range for which the chosen pixel is not designated as a still pixel candidate;
wherein the selected pixel is determined to be a still pixel if the counter is greater than a second selected threshold.

20. The apparatus of claim 19, wherein a still pixel candidate is excluded from further consideration by measuring a standard deviation over at least a selected portion of the frames containing the candidate pixel and excluding those candidate pixels having a standard deviation less than a third selected threshold.

21. The apparatus of claim 19, wherein a still pixel candidate is excluded from further consideration by estimating a motion vector for a block containing the still pixel candidate and excluding the candidate pixel if the motion vector is reliable.

22. The apparatus of claim 21, wherein the motion vector is reliable if the motion vector is non-zero and said the difference is less than a fourth selected threshold.

23. The apparatus of claim 18, wherein the motion vector endpoint in F(t), pixel D, is detected to be a still pixel and wherein the pixel value of the selected pixel, $M_A$, is calculated as a weighted average on a of an adjusted pixel value of pixel D, D', and the pixel value of the motion vector endpoint in F(t−1), pixel E.

24. The apparatus of claim 23, wherein the pixel value of the selected pixel is calculated by:

$$M_A = D'^* \alpha + E^*(1-\alpha).$$

25. The apparatus of claim 18, wherein the motion vector endpoint in F(t−1), pixel E, is detected to be a still pixel and wherein the pixel value of the selected pixel, $M_A$, is calculated as a weighted average on a of an adjusted value of E, E', and the motion vector endpoint in F(t), pixel D.

26. The apparatus of claim 25, wherein the pixel value of the selected pixel is calculated by:

$$M_A = D^* \alpha + E'^*(1-\alpha).$$

27. The apparatus of claim 18, wherein a pixel value temporal interpolation, T, comprises a weighted average on α of the pixel values of a pixel B and a pixel C, where pixels B and C are at about the same position in frames F(t) and F(t−1) as the interpolated pixel in frame α.

28. The apparatus of claim 27, wherein the motion vector endpoint in F(t) and F(t−1), pixels D and E, respectively, are detected to be still pixels and wherein the adjusted pixel value of pixel D, D', is given by a weighted average on the still value of D of the pixel values of T and D, and wherein the adjusted pixel value of pixel E, E', is given by a weighted average on the still value of E of T and E.

29. The apparatus of claim 28, wherein the pixel value of the selected pixel, $M_A$, is calculated as a weighted average on α of an adjusted value of pixel E, E', and the adjusted value of pixel D, D'.

30. The apparatus of claim 29, wherein the pixel value of the selected pixel is calculated by $$M_A = D'^* \alpha + E'^*(1-\alpha).$$

31. The apparatus of claim 30, wherein the pixel B in F(t) is a still pixel having a still level $S_B$, and wherein a revised pixel value of the selected pixel, $I_A$, is calculated as a weighted average on $S_B$ of the pixel values of T and $M_A$.

32. The apparatus of claim 31; wherein the pixel value of the selected pixel, $I_A$, is calculated by:

$$I_A = T^* S_B + M_A^*(1-S_B).$$

33. The apparatus of claim 19, wherein the difference comprises difference in intensity of the frames F(t) and F(t−1).

34. The apparatus of claim 18, wherein the pixel values comprise at least one of luminance, chrominance, and individual color intensities such as red, green, and blue.

* * * * *